(12) United States Patent
Wu et al.

(10) Patent No.: US 11,923,959 B2
(45) Date of Patent: Mar. 5, 2024

(54) AIRBORNE SHORT MESSAGE COMMUNICATION METHOD, APPARATUS, DEVICE AND SYSTEM, AND READABLE STORAGE MEDIUM

(71) Applicant: CHINA ELECTRONICS TECHNOLOGY AVIONICS CO., LTD., Sichuan (CN)

(72) Inventors: Fei Wu, Sichuan (CN); Junkang Ma, Sichuan (CN); Yongfeng Xie, Sichuan (CN); Xinsheng Mao, Sichuan (CN)

(73) Assignee: CHINA ELECTRONICS TECHNOLOGY AVIONICS CO., LTD., Sichuan (CN)

( * ) Notice: Subject to any disclaimer, the term of this patent is extended or adjusted under 35 U.S.C. 154(b) by 0 days.

(21) Appl. No.: 17/787,935

(22) PCT Filed: Dec. 16, 2020

(86) PCT No.: PCT/CN2020/136680
§ 371 (c)(1),
(2) Date: Jun. 21, 2022

(87) PCT Pub. No.: WO2021/227492
PCT Pub. Date: Nov. 18, 2021

(65) Prior Publication Data
US 2023/0024689 A1    Jan. 26, 2023

(30) Foreign Application Priority Data
May 11, 2020    (CN) .......................... 202010392623.3

(51) Int. Cl.
*H04B 7/185*    (2006.01)
*H04W 76/12*   (2018.01)

(52) U.S. Cl.
CPC ........ *H04B 7/18508* (2013.01); *H04W 76/12* (2018.02)

(58) Field of Classification Search
None
See application file for complete search history.

(56) References Cited

U.S. PATENT DOCUMENTS

| 4,710,774 A | 12/1987 | Gunny |
| 10,623,111 B2 | 4/2020 | Koksal et al. |

(Continued)

FOREIGN PATENT DOCUMENTS

| CN | 101702682 A | 5/2010 |
| CN | 109656831 A | 4/2019 |

(Continued)

OTHER PUBLICATIONS

International Search Report for PCT/CN2020/136680 dated Mar. 17, 2021, ISA/CN.

(Continued)

*Primary Examiner* — Shripal K Khajuria
(74) *Attorney, Agent, or Firm* — Yue (Robert) Xu; Apex Attorneys at Law, LLP

(57) ABSTRACT

An airborne short message communication method, apparatus, device and system, and a readable storage medium. In the technical solution provided in the present invention, the method comprises: an airborne short message communication device acquiring a message control command; by means of the message control command, selecting a target message type from among selectable message types and determining a sending frequency; generating a target message corresponding to the target message type; and sending the target message according to the determined sending frequency. According to the technical solution provided in the present invention, the problems of delayed communication and large (Continued)

consumption caused by an unchanging message type and message sending frequency can be avoided, and in an emergency state, the message type and the message sending frequency can be changed, such that an important message can be sent in a timely manner.

11 Claims, 3 Drawing Sheets

(56) References Cited

U.S. PATENT DOCUMENTS

| | | |
|---|---|---|
| 2007/0060048 A1 | 3/2007 | Kang et al. |
| 2011/0016190 A1 | 1/2011 | He et al. |
| 2018/0167136 A1 | 6/2018 | Eickhoff |
| 2020/0236607 A1* | 7/2020 | Zhu ................. H04W 40/26 |
| 2020/0242950 A1* | 7/2020 | Guo ..................... G01S 19/42 |
| 2020/0267771 A1* | 8/2020 | Deogun ............. H04L 5/0058 |

FOREIGN PATENT DOCUMENTS

| | | |
|---|---|---|
| CN | 110661588 A | 1/2020 |
| CN | 110830555 A | 2/2020 |
| CN | 111049569 A | 4/2020 |
| CN | 111130625 A | 5/2020 |
| CN | 111585642 A | 8/2020 |

OTHER PUBLICATIONS

Zhang, Zhifeng et al., Application of Short Message Communication Function of Beidou in Emergency Situation, Computer Measurement & Control, vol. 26, No. 10, Oct. 31, 2018 (Oct. 31, 2018), section 1.

* cited by examiner

AIRBORNE SHORT MESSAGE COMMUNICATION METHOD, APPARATUS, DEVICE AND SYSTEM, AND READABLE STORAGE MEDIUM

This application is the national phase of International Patent Application No. PCT/CN2020/136680, titled "AIRBORNE SHORT MESSAGE COMMUNICATION METHOD, APPARATUS, DEVICE AND SYSTEM, AND READABLE STORAGE MEDIUM", filed on Dec. 16, 2020, which claims priority to Chinese Patent Application No. 202010392623.3, titled "AIRBORNE SHORT MESSAGE COMMUNICATION METHOD, APPARATUS, DEVICE AND SYSTEM, AND READABLE STORAGE MEDIUM", filed on May 11, 2020 with the China National Intellectual Property Administration (CNIPA), both of which are incorporated herein by reference in their entireties.

FIELD

The present disclosure relates to the field of communication technology, and in particular to an airborne short message communication method, apparatus, device and system, and a readable storage medium.

BACKGROUND

At present, an aircraft usually transmits monitoring data and conditions of the aircraft in communication with the outside through short messages such as airborne Beidou short messages. However, the conventional airborne short message communication solutions have the drawbacks of delayed communication which results in inaccurate navigation and positioning, excessive system burden and large consumption (including energy consumption and computer resource consumption). In case of large amount of users and large amount of short messages to be transmitted, the short message system will be overloaded and therefore important monitoring data cannot be transmitted effectively.

Therefore, how to effectively reduce the consumption and provide in-time communication in the airborne short message communication is a technical problem to be solved urgently.

SUMMARY

An airborne short message communication method, apparatus, device and system, and a readable storage medium are provided according to the present disclosure to reduce consumption and ensure timely communication.

In order to solve the above technical problems, the following technical solutions are provided according to the present disclosure.

An airborne short message communication method applicable in an airborne short message communication device, includes:
  acquiring a message control command;
  selecting a target message type from candidate message types and determining a transmission frequency based on the message control command;
  generating a target message corresponding to the target message type; and
  transmitting the target message at the transmission frequency.

Preferably, the selecting a target message type from candidate message types and determining a transmission frequency based on the message control command includes:
  determining, if there are two or more message control commands, a target message control command from the message control commands based on priorities; and
  selecting the target message type and determining the transmission frequency based on the target message control command.

Preferably, the acquiring a message control command includes:
  receiving the message control command transmitted by a ground control device.

Preferably, the acquiring a message control command includes:
  monitoring a communication control input device of an aircraft to acquire the message control command.

Preferably, the acquiring a message control command includes:
  acquiring navigation information and route information from an avionics system of an aircraft; and
  generating the message control command based on the navigation information and the route information.

Preferably, the generating the message control command based on the navigation information and the route information includes:
  determining whether the aircraft deviates from a scheduled route based on the navigation information and the route information; and
  if the aircraft deviates from the scheduled route, calculating a route deviation distance and generating the message control command corresponding to the route deviation distance.

An airborne short message communication apparatus, applicable in an airborne short message communication device, includes a command acquisition module, a message adjustment module, a message generation module, and a message transmission module.

The command acquisition module is configured to acquire a message control command.

The message adjustment module is configured to select a target message type from candidate message types and determine a transmission frequency, based on the message control command.

The message generation module is configured to generate a target message corresponding to the target message type.

The message transmission module is configured to transmit the target message at the transmission frequency.

An airborne short message communication device includes a memory and a processor.

The memory stores a computer program.

The processor is configured to perform, when executing the computer program, the airborne short message communication method described above.

An airborne short message communication system includes a ground control device, a Beidou antenna, a Beidou baseband device, an avionics system and a communication control input device on an aircraft, and the airborne short message communication device described above.

An airborne short message communication device includes a memory and a processor.

The memory stores a computer program.

The processor is configured to perform, when executing the computer program, the airborne short message communication method described above.

A readable storage medium stores a computer program that, when executed by a processor, causes the processor to perform the airborne short message communication method described above.

The method according to the embodiments of the present disclosure is applicable in the airborne short message communication device. The airborne short message communication device acquires a message control command; selects a target message type from candidate message types and determines a transmission frequency, based on the message control command; generates a target message corresponding to the target message type; and transmits the target message at the determined transmission frequency.

It is found that delayed communication or large consumption in the conventional airborne short message communication solutions are caused by invariable message transmission frequency and message type. For example, a low message transmission frequency results in delayed communication, and a high message transmission frequency results in large consumption. Based on this, an airborne short message communication method in which the message type and the message transmission frequency are adjustable is provided. In this method, the target message type is selected from the candidate message types based on the message control command, and the transmission frequency is determined. Then, a message is generated and transmitted based on the selected target message type and the determined transmission frequency. In this way, delayed communication and large consumption caused by invariable message type and message transmission frequency can be avoided. In an emergency, important messages can be transmitted in time by changing the message type and the message transmission frequency.

Accordingly, an airborne short message communication apparatus, device and system and a readable storage medium corresponding to the airborne short message communication method described above are further provided according to the embodiments of the present disclosure, which have the technical effects described above, and description thereof is omitted herein.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF THE EMBODIMENTS

In order to understand the solutions according to the present disclosure by those skilled in the art, the present disclosure are described below in detail in conjunction with the drawings and the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

Figure 1:
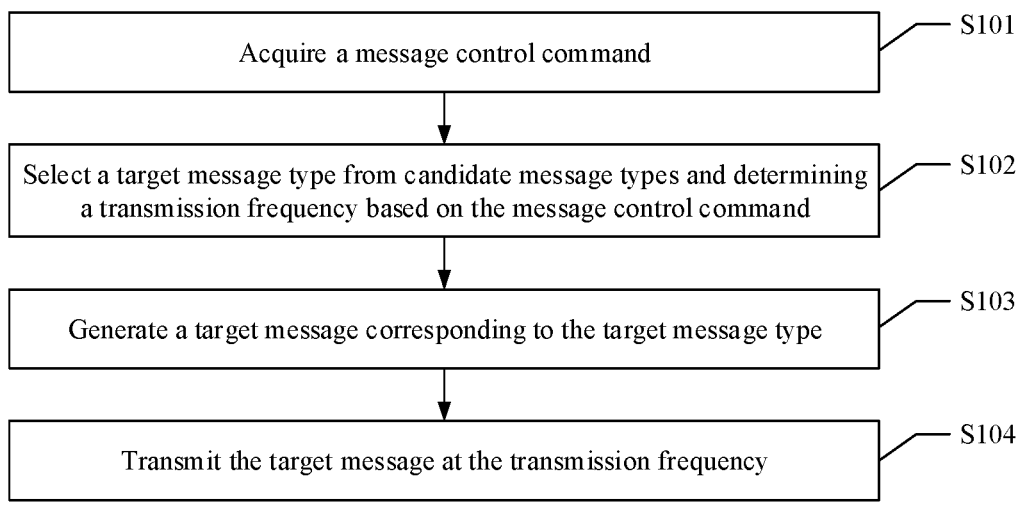
FIG. 1 is a flowchart of an airborne short message communication method according to an embodiment of the present disclosure.

Reference is made to FIG. 1, which is a flowchart of an airborne short message communication method according to an embodiment of the present disclosure. The method is applicable in an airborne short message communication device (for example, an airborne Beidou short message communication device). The method includes the following steps S101 to S104.

In step S101, a message control command is acquired.

The message control command is multi-input supported. Priority of the message control command may be configured with factory default, or may be modified with dedicated ground devices when performing aircraft detection.

The message control command is a command for controlling a message type and a transmission frequency. The message control command is inputted/acquired mainly in two manners: to be generated through an internal program or to be received from other devices or platforms external to the airborne short message communication device.

In practical application, the message control command may be acquired in either of the above two manners. In a case that the message control command is received from other devices or platforms external to the airborne short message communication device, the manners of acquiring the message control command may be subdivided according to the devices or platforms that transmit the message control command.

If multiple message control commands are acquired through different channels/manners, one message control command to be executed (referred to as a target message control command hereinafter) may be selected from the multiple message control commands based on priorities of these channels/manners.

For purpose of good understanding, several preferred manners to acquire the message control command are set forth as following. That is, manners to acquire the message control command include, but not limited to, the following manners.

In manner 1, the message control command is received from a ground control device.

The ground control device may be a device in a tower/control tower.

That is, the ground control device transmits the message control command to the airborne short message communication device. In this way, the ground personnel controls message transmission and message generation of the airborne short message communication device based on scheduling requirements or aircraft monitoring.

In manner 2, the message control command is acquired by monitoring a communication control input device of the aircraft.

In this embodiment, a communication control input device may be arranged on the aircraft. The device may be in the form of a communication control button arranged in a cockpit. When the aircraft encounters an emergency, the crew on the aircraft may control the message transmission type and frequency through the communication control input device.

That is, by simply monitoring the communication control input device, the airborne short message communication device may acquire the message control command when the communication control input device is operated.

In manner 3, considering the case that the aircraft deviates from a normal route and it is required to focus on a current situation of the aircraft for safety, relevant information may be acquired from an avionics system of the aircraft and a corresponding message control command may be generated. The message control command is generated by performing the following step 1 and step 2.

In step 1, navigation information and route information are acquired from the avionics system of the aircraft.

In step 2, the message control command is generated based on the navigation information and the route information.

For purpose of description, the above two steps are described in combination in the following.

The route information and the navigation information of the avionics system of the aircraft may be received through an A429 or AFDX bus. The route information may be a flight path curve with three-dimensional position information including longitude, latitude and altitude. The navigation information is a real-time position of the aircraft, which may be three-dimensional position information including time, latitude, longitude and altitude.

After the navigation information and the route information are acquired, the message control command is generated based on the navigation information and the route information by performing the following steps 2.1 and 2.2.

In step 2.1, whether the aircraft deviates from a scheduled route is determined based on the navigation information and the route information.

In step 2.2, if the aircraft deviates from the scheduled route, a route deviation distance is calculated and a message control command corresponding to the route deviation distance is generated.

The message control command is generated as following. A short message including time and three-dimensional position information is selected as the message type. A nearest distance between the real-time position of the aircraft and the route position information is calculated, that is, the deviation distance is calculated. If the deviation distance exceeds a specified threshold Lkm (L may be set according to actual situations), the transmission frequency is determined as twice of a lowest transmission frequency, that is, the message transmission frequency is increased to improve accuracy and timeliness of the ground monitoring of the aircraft position. Each time the deviation distance exceeds 2 Lkm (or other values, for example, 3 Lkm), a current transmission frequency is doubled until the transmission frequency is increased to a maximum transmission frequency. That is, assuming that the lowest transmission frequency is f, in a case that the deviation distance exceeds Lkm but does not exceed 2 Lkm, the transmission frequency is determined as 2f. In a case that the deviation distance exceeds 2 Lkm but does not exceed 4 Lkm, the transmission frequency is determined as 4f.

In practical application, the message control command may be acquired in one of the above manners or in at least two of the above manners.

In addition, in practical application, an initial message type and an initial message transmission frequency (or referred to as message type and message transmission frequency in a normal state) may be preset.

Particularly, in a case that message control commands are acquired in at least two manners, if the message control commands are acquired through different channels in a same time period, one of the message control commands may be selected and executed according to preset priorities. For purpose of good understanding, the determination of the target message control command is described in detail below by taking a case in which message control commands are acquired in the above three manners as an example.

First, the priority corresponding to each acquisition manner is defined in advance. In this embodiment, the priority of manner 1 is set to be higher than that of manner 2, and the priority of manner 2 is set to be higher than that of manner 3. If a message control command is acquired in each of the three manners, the message control command acquired in manner 1 serves as the target message control command.

In step S102, a target message type is selected from candidate message types and a transmission frequency is determined, based on the message control command.

Short message types (i.e. specific message formats and message contents) and message transmission frequencies (for example, every 1 minute to every 15 minutes, in steps of half a minute or other time intervals) may be preset in the system. The short message types may be numbered as, for example, 1, . . . , N (for example, numbered in descending order of message length). The message transmission frequencies may be numbered as, for example, 1, . . . M. The message control command may directly specify a message type and a transmission frequency.

The message type and the transmission frequency are adjusted based on the message control command. For example, the message control command may include two serial numbers corresponding to the message type and the transmission frequency, respectively.

Since there are many channels to acquire the message control command in practical application, in order to effectively adjust the message type and message transmission frequency, message control commands from different sources may be assigned with priorities in advance. In a case that at least two message control commands are acquired at the same time, a target message control command may be determined from the message control commands based on the priorities, and then the message type and the transmission frequency may be adjusted based on the target message control command. That is, the step S102 may include the following step 1 and step 2.

In step 1, if the number of the message control commands is greater than 1, a target message control command is determined from the message control commands based on the priorities.

In step 2, the target message type is selected from the candidate message types and the transmission frequency is determined, based on the target message control command.

In step S103, a target message corresponding to the target message type is generated.

After the message type and the transmission frequency are adjusted, the target message corresponding to the adjusted message type may be generated.

Different message types correspond to different message lengths and message contents (i.e. specific data information to be transmitted, such as a flight speed, a fuel volume and a position).

In the process of generating the target message, various data of the aircraft may be acquired. Then data to be transmitted is selected from the various data based on the message content corresponding to the message type, and the target message is generated based on the adjusted message type.

In step S104, the target message is transmitted at the transmission frequency.

The method according to the embodiments of the present disclosure is applied in the airborne short message communication device. The airborne short message communication device acquires a message control command; selects a target message type from candidate message types and determines a transmission frequency, based on the message control command; generates a target message corresponding to the target message type; and transmits the target message at the determined transmission frequency.

It is found that delayed communication or large consumption in the conventional airborne short message communication solutions are caused by invariable message transmission frequency and message type. For example, a low message transmission frequency results in delayed communication, and a high message transmission frequency results in large consumption. Based on this, an airborne short message communication method in which the message type and the message transmission frequency are adjustable is provided. In this method, the target message type is selected from the candidate message types based on the message control command, and the transmission frequency is determined. Then, a message is generated and transmitted based on the selected target message type and the determined transmission frequency. In this way, delayed communication and large consumption caused by invariable message type and message transmission frequency can be avoided. In an emergency, important messages can be transmitted in time by changing the message type and the message transmission frequency.

Corresponding to the above method embodiments, an airborne short message communication apparatus applicable in the airborne short message communication device is provided according to an embodiment of the present disclosure. The airborne short message communication apparatus described below may refer to the airborne short message communication method described above.

Figure 2:
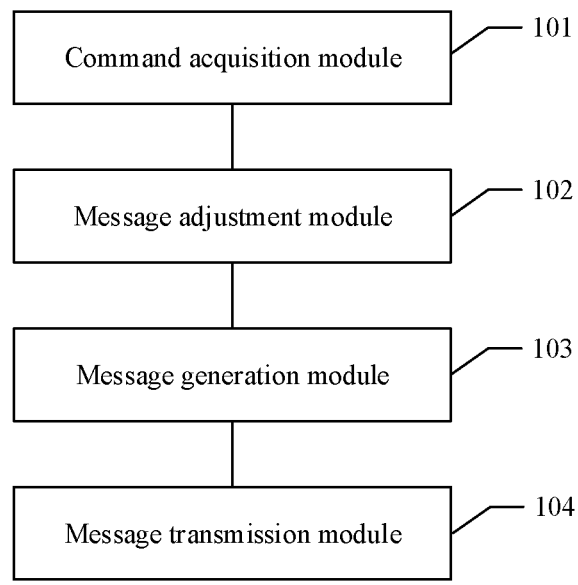
FIG. 2 is a schematic structural diagram of an airborne short message communication apparatus according to an embodiment of the present disclosure.

Referring to FIG. 2, the apparatus includes a command acquisition module 101, a message adjustment module 102, a message generation module 103, and a message transmission module 104.

The command acquisition module 101 is configured to acquire a message control command.

The message adjustment module 102 is configured to select a target message type from candidate message types and determine a transmission frequency, based on the message control command.

The message generation module 103 is configured to generate a target message corresponding to the target message type.

The message transmission module 104 is configured to transmit the target message at the transmission frequency.

The method according to the embodiments of the present disclosure is applied to the airborne short message communication device. The airborne short message communication device acquires a message control command; selects a target message type from candidate message types and determines a transmission frequency, based on the message control command; generates a target message corresponding to the target message type; and transmits the target message at the determined transmission frequency.

It is found that delayed communication or large consumption in the conventional airborne short message communication solutions are caused by invariable message transmission frequency and message type. For example, a low message transmission frequency results in delayed communication, and a high message transmission frequency results in large consumption. Based on this, an airborne short message communication method in which the message type and the message transmission frequency are adjustable is provided. In this method, the target message type is selected from the candidate message types based on the message control command, and the transmission frequency is determined. Then, a message is generated and transmitted based on the selected target message type and the determined transmission frequency. In this way, delayed communication and large consumption caused by invariable message type and message transmission frequency can be avoided. In an emergency, important messages can be transmitted in time by changing the message type and the message transmission frequency.

In an embodiment of the present disclosure, the message adjustment module 102 is specifically configured to: determine, if the number of the message control commands is greater than 1, a target message control command from the message control commands based on the priorities; and select the target message type and determine the transmission frequency, based on the target message control command.

In an embodiment of the present disclosure, the command acquisition module 101 includes a ground control unit configured to receive the message control command from a ground control device.

In an embodiment of the present disclosure, the command acquisition module 101 includes a pilot unit configured to monitor a communication control input device of the aircraft to acquire the message control command.

In an embodiment of the present disclosure, the command acquisition module 101 includes an aircraft anomaly handling unit configured to acquire navigation information and route information from an avionics system of the aircraft, and generate a message control command based on the navigation information and the route information.

In an embodiment of the present disclosure, the aircraft anomaly handling unit is specifically configured to: determine whether the aircraft deviates from a scheduled route based on the navigation information and the route information, and if the aircraft deviates from the scheduled route, calculate a route deviation distance and generate a message control command corresponding to the route deviation distance.

Corresponding to the above method embodiments, an airborne short message communication device is further provided according to an embodiment of the present disclosure. The airborne short message communication device described below may refer to the airborne short message communication method described above.

Figure 3:
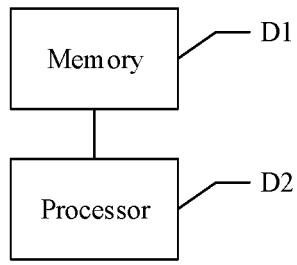
FIG. 3 is a schematic structural diagram of an airborne short message communication device according to an embodiment of the present disclosure.

Referring to FIG. 3, the airborne short message communication device includes a memory D1 and a processor D2.

The memory D1 is configured to store a computer program.

The processor D2 is configured to execute the computer program to perform the airborne short message communication method according to the above method embodiments.

The steps of the airborne short message communication method described above may be implemented by structures of the airborne short message communication device.

Corresponding to the above method embodiments, an airborne short message communication system is further provided according to an embodiment of the present disclosure. The airborne short message communication system described below may refer to the airborne short message communication method described above.

Figure 4:
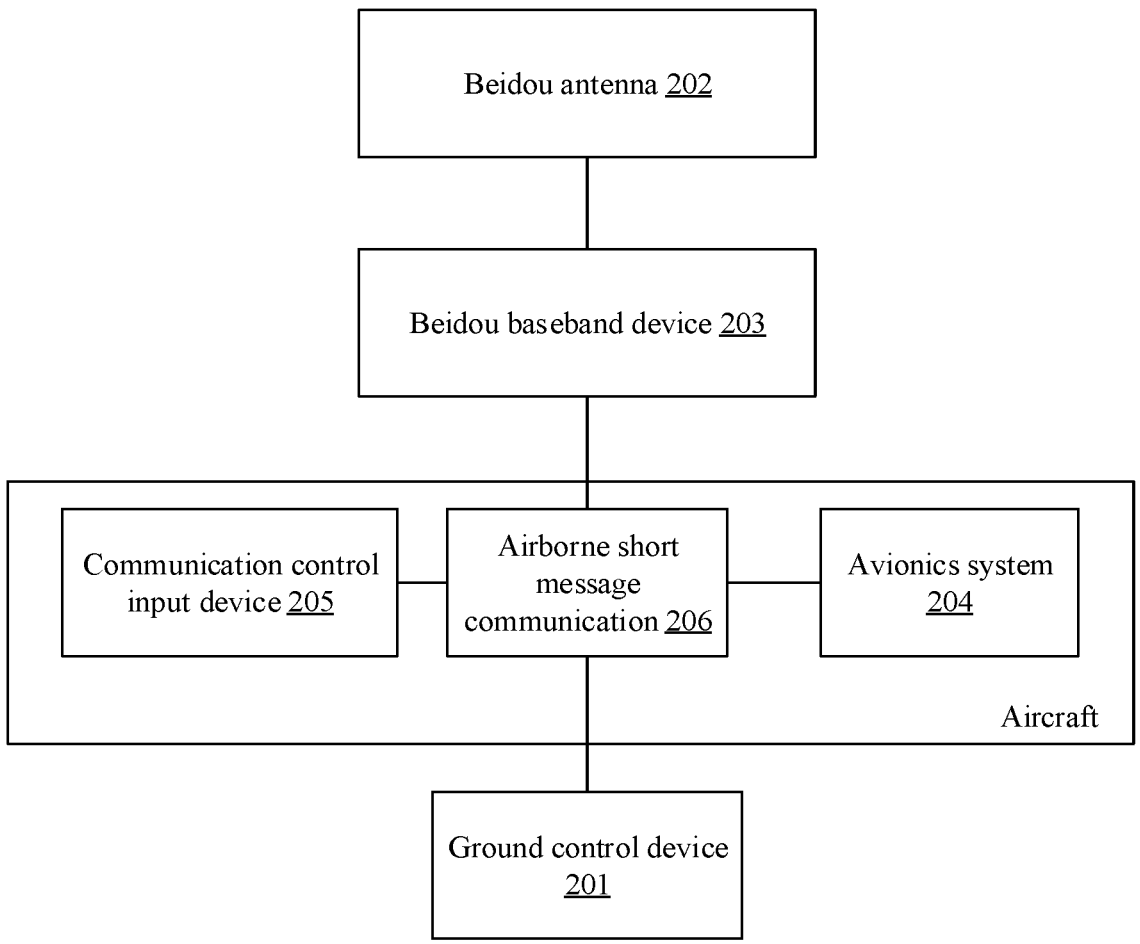
FIG. 4 is a schematic diagram of an airborne short message communication system according to an embodiment of the present disclosure.

Referring to FIG. 4, the airborne short message communication system includes a ground control device, a Beidou antenna, a Beidou baseband device, an avionics system and a communication control input device on an aircraft, and the airborne short message communication device described above.

The steps of the airborne short message communication method described above may be implemented in the airborne short message communication system.

In this embodiment, the communication control input device may be a communication control button arranged in a cockpit. When the aircraft encounters an emergency, the crew may control the message transmission type and frequency through the communication control input device.

Figure 5:
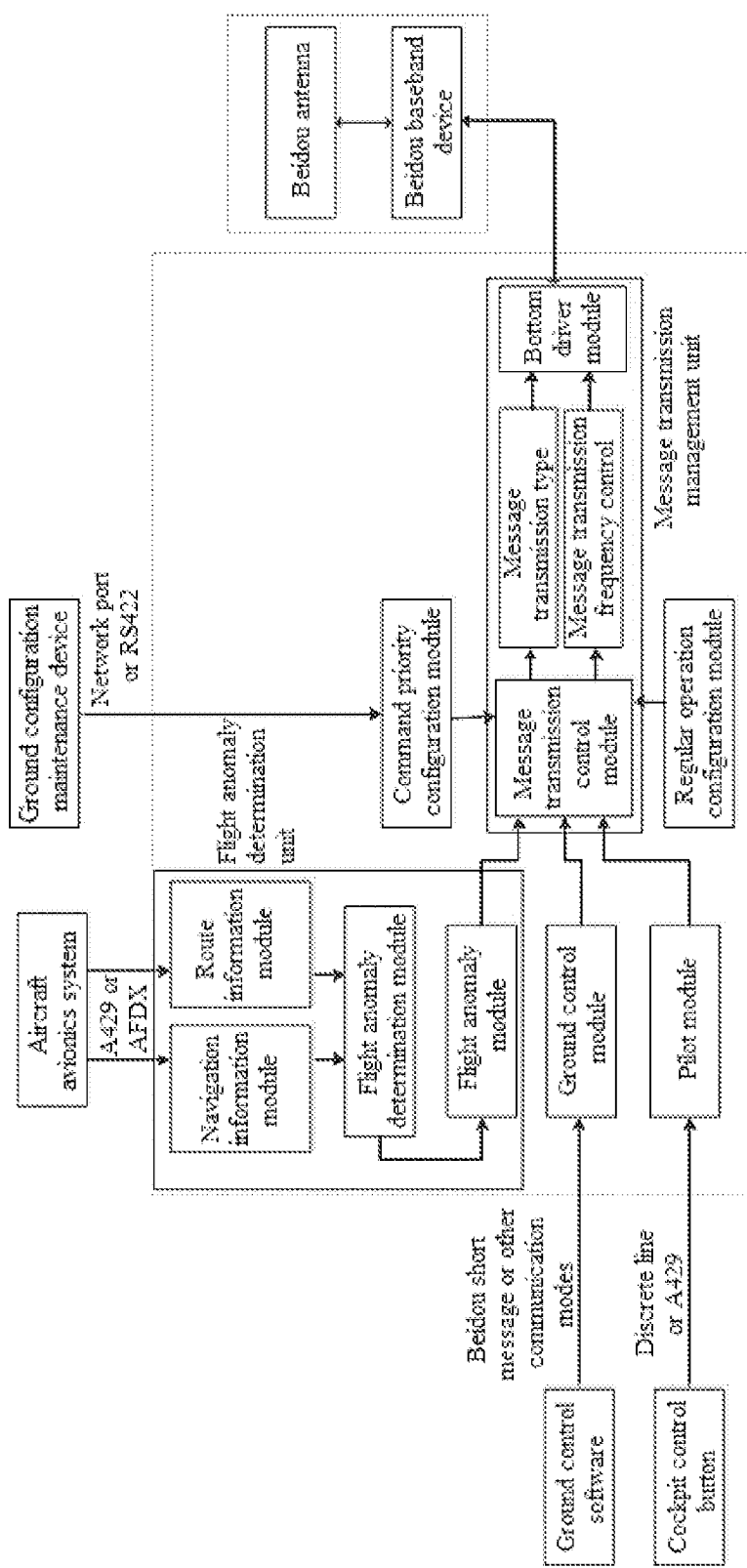
FIG. 5 is a schematic structural diagram of an airborne short message communication system according to an embodiment of the present disclosure.

Reference is made to FIG. 5, which is a schematic structural diagram of an airborne short message communication system according to an embodiment of the present disclosure. For structural division of the airborne short message communication device and module division of the airborne short message communication apparatus, reference may be made to FIG. 5.

In FIG. 5, components other than the ground control software, the cockpit control button, the aircraft avionics system, the ground configuration maintenance device, the Beidou antenna and the Beidou baseband device may be regarded as components in the airborne short message communication device according to the embodiments of the present disclosure, or regarded as functional modules of the airborne short message communication apparatus according to the embodiments of the present disclosure.

The system includes a message transmission management unit, a command priority configuration module, a regular operation configuration module, a pilot module, a ground control module, a flight anomaly determination unit, a Beidou baseband device and a Beidou antenna. Functions of the modules and units are described as follows.

The regular operation module is configured to store information such as message types and message transmission frequencies.

The command priority configuration module is configured to store priority information of control commands from the flight abnormality module, the ground control module, the pilot module and the registration operation configuration module. The priority information may be configured by the ground maintenance configuration device through a network port or RS422 when the aircraft is on the ground.

The ground control module is configured to receive a command from ground control software through a Beidou short message channel or other satellite channels.

The pilot module is configured to receive a command from the cockpit control button through a discrete line or A429 bus.

The flight anomaly determination unit is configured to provide a flight anomaly command for the message transmission management unit. The flight anomaly command is generated as follows.

The route information module receives route information from the aircraft avionics system through an A429 or AFDX bus.

The navigation information module receives a real-time position of the aircraft from the aircraft avionics system through the A429 or AFDX bus.

The flight anomaly determination module periodically calculates a nearest distance between the real-time position of the aircraft and the route position information to determine whether the aircraft flights abnormally, generates a flight anomaly command in a case that the aircraft flights abnormally, and transmits the flight anomaly command to the message transmission management unit. When generating the flight anomaly command, a message control command of a short message type and a transmission frequency is generated and the message control command is transmitted to the message transmission management unit through the flight anomaly module.

A process flow of the system is roughly as follows.

The message transmission control module of the message transmission management unit receives information from the regular operation configuration module, the flight anomaly module, the ground control module and the pilot module, reads the priority information of the command priority configuration module, regards the regular operation configuration module, the flight anomaly module, the ground control module and the pilot module as sources of message control commands, and processes the control message commands transmitted from the modules according to the priority information to obtain the message type and the transmission frequency.

Determination of the message type and the transmission frequency includes but is not limited to the following situations.

The registration operation configuration module has information of a message type and message transmission frequency control, and is capable of directly generating control regarding message transmission type and message transmission frequency. In a case that the flight anomaly module, the ground control module and the pilot module have the information of the message type and the message transmission frequency, control regarding message transmission type and message transmission frequency is directly generated, that is, a message control command is generated. In a case that the flight anomaly module, the ground control module and the pilot module only have control information of the message transmission frequency, a short message type having a shortest length of time and position information may be selected as the message type. In a case that the flight anomaly module, the ground control module and the pilot module do not have the control information of the message type and the message sending frequency, the short message type having a shortest length of time and position information may be selected as the message type, and a maximum short message transmission frequency is determined as the transmission frequency.

After the message type and the transmission frequency are determined, control information regarding the message transmission type and the message transmission frequency may be generated, that is, the message type is selected and the transmission frequency is determined, so that a bottom drive module controls a Beidou airborne device and the Beidou antenna to generate the target message corresponding to the target message type and transmit the target message at the transmission frequency.

Corresponding to the above method embodiments, a readable storage medium is further provided according to an embodiment of the present disclosure. The readable storage medium described below and the airborne short message communication method described above may be with reference to each other.

The readable storage medium stores a computer program that, when being executed by a processor, enables the processor to perform the airborne short message communication method according to the above method embodiments.

The readable storage medium may be a readable storage media storing program codes, such as a U disk, a mobile hard disk, a read-only memory (ROM), a random access memory (RANI), a magnetic disc or an optical disc.

It should be appreciated by those skilled in the art that, the exemplary units and algorithm steps in the embodiments described herein can be implemented as electronic hardware, computer software, or a combination of computer software and the electronic hardware. In order to clearly illustrate the interchangeability of hardware and software, the composition and steps of each example have been described generally in terms of functions in the above description. Whether the functions being implemented in a hardware form or in a software form depends on a particular application of technical solutions and a design constraint. Skilled artisans may implement the described functions in varying ways for a particular application, but such implementation should not be interpreted as causing a departure from the scope of the present disclosure.

The invention claimed is:

1. An airborne short message communication method applicable in an airborne short message communication device, the method comprising:
    acquiring a message control command;
    selecting a target message type from candidate message types and determining a transmission frequency, based on the message control command, wherein the transmission frequency defines how frequent the airborne short message communication device transmit target messages to an external device;
    generating target messages corresponding to the target message type; and
    transmitting the target messages to the external device using the transmission frequency.

2. The airborne short message communication method according to claim 1, wherein the selecting a target message type from candidate message types and determining a transmission frequency based on the message control command comprises:
    determining, if there are two or more message control commands, a target message control command from the message control commands based on priorities; and
    selecting the target message type and determining the transmission frequency, based on the target message control command.

3. The airborne short message communication method according to claim 1, wherein the acquiring a message control command comprises:
    receiving the message control command transmitted by a ground control device.

4. The airborne short message communication method according to claim 1, wherein the acquiring a message control command comprises:
    monitoring a communication control input device of an aircraft to acquire the message control command.

5. The airborne short message communication method according to claim 1, wherein the acquiring a message control command comprises:
    acquiring navigation information and route information from an avionics system of an aircraft; and
    generating the message control command based on the navigation information and the route information.

6. The airborne short message communication method according to claim 5, wherein the generating the message control command based on the navigation information and the route information comprises:
    determining whether the aircraft deviates from a scheduled route based on the navigation information and the route information; and
    if the aircraft deviates from the scheduled route, calculating a route deviation distance and generating the message control command corresponding to the route deviation distance.

7. The airborne short message communication method according to claim 1, wherein the acquiring a message control command comprises:
    acquiring navigation information and route information from an avionics system of an aircraft;
    determining a deviation distance of the aircraft from a schedule route based on the navigation information and the route information;
    determining the transmission frequency based on the deviation distance, wherein a larger value of the transmission frequency corresponds to a larger value of the deviation distance;
    generating the message control command according to the determined deviation distance.

8. The airborne short message communication method according to claim 1, wherein the acquiring a message control command comprises:
    acquiring a first message control command obtained in a first manner and a second message control command obtained in a second manner within a period;
    determining the first message control command as the message control command in response to a priority of the first manner is higher than a priority of the second manner; and
    determining the second message control command as the message control command in response to a priority of the second manner is higher than a priority of the first manner.

9. An airborne short message communication device comprising:
    a memory storing a computer program; and
    a processor configured to, when executing the computer program, perform:
    acquiring a message control command;
    selecting a target message type from candidate message types and determining a transmission frequency, based on the message control command, wherein the transmission frequency defines how frequent the airborne short message communication device transmit target messages to an external device;
    generating target messages corresponding to the target message type; and
    transmitting the target messages to the external device using the transmission frequency.

10. An airborne short message communication system comprising:
    a ground control device, a Beidou antenna, a Beidou baseband device, an avionics system and a communication control input device on an aircraft, and the airborne short message communication device according to claim 9.

11. A non-transitory readable storage medium storing a computer program that, when being executed by a processor, causes the processor to perform:
- acquiring a message control command;
- selecting a target message type from candidate message types and determining a transmission frequency, based on the message control command, wherein the transmission frequency defines how frequent an airborne short message communication device transmit target messages to an external device;
- generating target messages corresponding to the target message type; and
- transmitting the target messages to the external device using the transmission frequency.

* * * * *